(12) United States Patent
Chan (10) Patent No.: US 11,382,399 B2
(45) Date of Patent: Jul. 12, 2022

(54) STICK PRODUCT REFILL SYSTEM

(71) Applicant: Kevin Chan, Lebanon, NJ (US)

(72) Inventor: Kevin Chan, Lebanon, NJ (US)

( * ) Notice: Subject to any disclaimer, the term of this patent is extended or adjusted under 35 U.S.C. 154(b) by 400 days.

(21) Appl. No.: 16/679,892

(22) Filed: Nov. 11, 2019

(65) Prior Publication Data
US 2021/0137242 A1    May 13, 2021

(51) Int. Cl.
| | |
|---|---|
| A45D 40/06 | (2006.01) |
| B29C 39/38 | (2006.01) |
| B29C 69/00 | (2006.01) |
| B29C 39/02 | (2006.01) |
| A45D 40/00 | (2006.01) |
| B29L 31/00 | (2006.01) |

(52) U.S. Cl.
CPC .............. *A45D 40/06* (2013.01); *B29C 39/02* (2013.01); *B29C 39/38* (2013.01); *B29C 69/001* (2013.01); *A45D 2040/0043* (2013.01); *B29L 2031/718* (2013.01)

(58) Field of Classification Search
CPC ...... A45D 40/04; A45D 40/06; A45D 40/065; A45D 2040/0043; B29C 39/02; B29C 39/38; B29C 69/001
See application file for complete search history.

(56) References Cited

U.S. PATENT DOCUMENTS

| | | | |
|---|---|---|---|
| 2,921,675 A | 1/1960 | Clark et al. | |
| 2,932,386 A | 4/1960 | Ush Kow | |
| 3,338,397 A | 8/1967 | Noyack et al. | |
| 3,728,034 A | 4/1973 | Winter | |
| 4,505,607 A | 3/1985 | Sugiyama | |
| 5,399,040 A | 3/1995 | Holloway | |
| 5,597,253 A | 1/1997 | Lepsius et al. | |
| 7,629,757 B2 | 12/2009 | Murphy et al. | |
| 8,875,955 B2 * | 11/2014 | Arora ................ | B65D 83/0011 |
| | | | 401/175 |
| 10,660,421 B2 * | 5/2020 | Crawford ............... | A45D 40/04 |
| 2007/0147948 A1 * | 6/2007 | Murakoshi ............ | A45D 40/04 |
| | | | 401/175 |
| 2021/0289919 A1 * | 9/2021 | Th .......................... | A45D 40/14 |

* cited by examiner

*Primary Examiner* — Jennifer C Chiang
(74) *Attorney, Agent, or Firm* — Thomas J. Germinario (57) ABSTRACT

A system for refilling a stick product, such as lipstick or deodorant, in a propel-repel dispenser allows the reuse of the propel-repel mechanism. The stick product refill is shaped and dimensioned to be inserted into the open end of the dispenser and to attach to the receptacle that holds the stick product after the used product has been removed. Attachment of the refill to the stick receptacle is by an attachment component on the outer surface of an anchor cap enclosing the distal end of the refill and/or on the receptacle itself. Once secured to the receptacle, the refill can be advanced and retracted by the propel-repel mechanism so that it protrudes when in use and is withdrawn with the dispenser to protect it when not in use.

11 Claims, 8 Drawing Sheets

STICK PRODUCT REFILL SYSTEM

FIELD OF INVENTION

The present invention relates to the general field of stick products and their dispensers, and more particularly to stick product refills.

BACKGROUND OF THE INVENTION

Stick products, such as lipsticks and deodorants, are commonly used in dispensers having a propel-repel mechanism, in which a threaded spindle is turned to longitudinally advance and retract a receptacle which holds the stick product. In existing dispenser systems, when the stick product is exhausted, at most the outer casing of the dispenser can be re-used, but the propel-repel mechanism is discarded. The present invention provides a system by which the stick product can be refilled without discarding the dispenser's propel-repel mechanism, thereby advancing the purposes of recycling and resource conservation, as well as providing cost savings to consumers.

SUMMARY OF THE INVENTION

The present invention is a system for refilling a stick product dispenser having a propel-repel mechanism without replacing that mechanism. The stick product refill is shaped and dimensioned to be inserted into the open end of the dispenser and to attach to the receptacle that holds the stick product after the used product has been removed. Attachment of the refill to the stick receptacle is by an attachment means on the outer surface of an anchor caps enclosing the distal end of the refill and/or on the receptacle itself. The attachment means can be a magnet which is attracted to a ferromagnetic material comprising the receptacle and/or the anchor cap, or an adhesive which adheres to the receptacle and/or the anchor cap, or one or more threads, detents, slots or ridges which conjugately mate with cooperating structures in the receptacle and/or the anchor cap. Once secured to the receptacle, the refill can be advanced and retracted by the propel-repel mechanism so that it protrudes when in use and is withdrawn with the dispenser to protect it when not in use.

The stick product refill is formed by pouring melted stick product into the proximal end of a tubular product sleeve which has been sealed by an anchor cap at its distal end. Once the sleeve is filled with the molten product, the proximal end of the sleeve is sealed with another anchor cap. The interior of the tubular productsleeve has the shape and dimensions of the stick product refill, except that it is longer. Preferably, the interior of the sleeve has a coating which prevents the molten stick product from adhering to it. After the stick product is cooled and has solidified, the tubular product sleeve is cut between its proximal and distal ends (either a square cut or a slanted cut, depending on the specific stick product) to produce two sleeved product refills, each having an anchor cap which may have attachment means at its distal end. The two sleeved product refills can have equal lengths or different lengths, depending upon the specific stick product. In preparation for shipping, a tubular protective cover fits over the sleeved product refill and is glued to the tubular product sleeve.

Upon purchasing the refill, the consumer will remove the protective cover with the product sleeve and insert the distal end of the refill into the open end of the dispenser after the used stick produce is removed from the stick receptacle. The receptacle is advanced toward the open end of receptacle and the anchor cap engages it so that it becomes secured to the receptacle by the attachment means. Now the propel-repel mechanism can advance and retract the stick product refill as it did the original stick product and the entire dispenser can continue to be used.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 7:
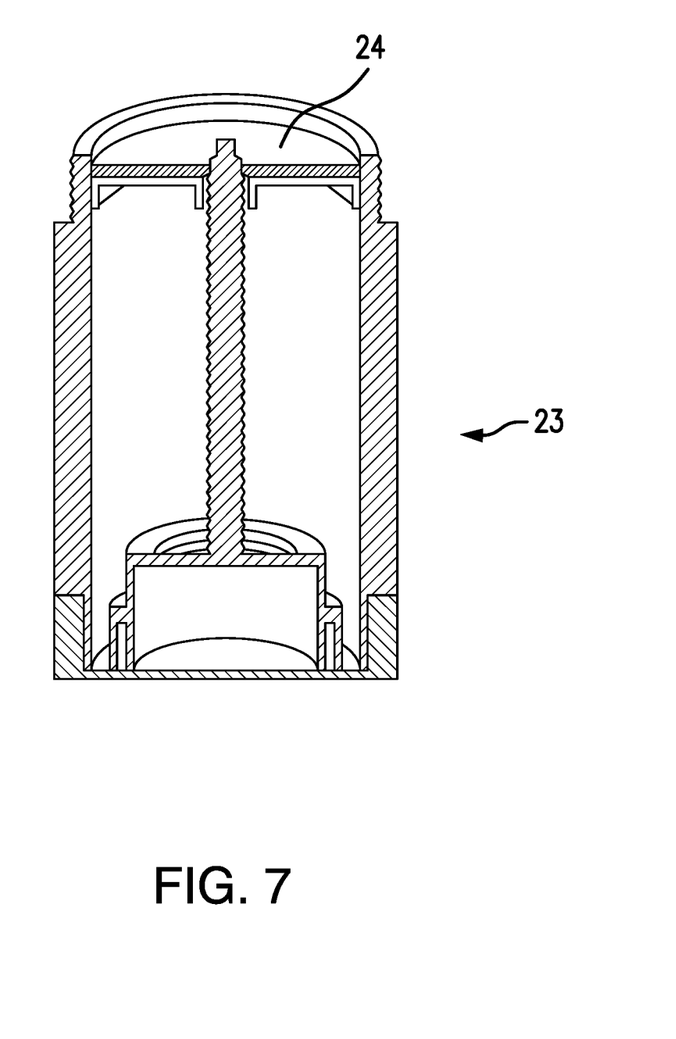
FIG. 7 is a perspective view of the propel-repel mechanism of the dispenser.

FIGS. 1A-1D illustrate the preparation of a tubular product sleeve 11 to serve as a mold for the stick product refill according to one embodiment of the present invention. The first anchor cap 12 is inserted into the distal end of the tubular product sleeve 11. In this embodiment, the outer surface of the two anchor caps 12 14 is a ferromagnetic material which is attracted by a magnetic attachment means 24 located on the dispenser's stick receptacle 22 (as shown in FIG. 7). But in other embodiments, as previously mentioned, the magnetic or other attachment means can be located on the anchor caps 12 14.

Figure 1A:
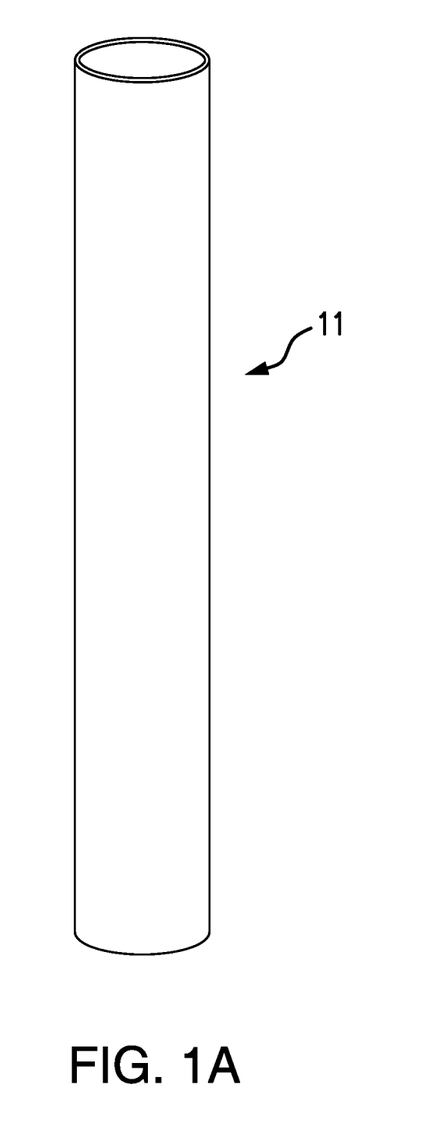
FIG. 1A is a perspective view of a tubular product sleeve.
Figure 1B:
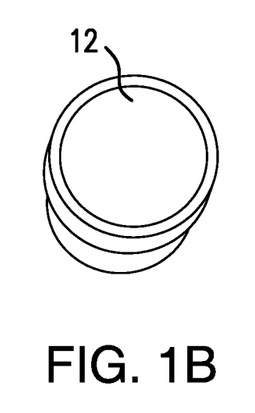
FIG. 1B is a perspective obverse view of an anchor cap.
Figure 1C:
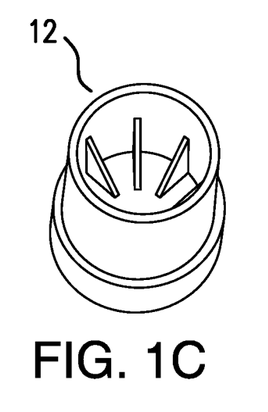
FIG. 1C is a perspective reverse view of an anchor cap.
Figure 1D:
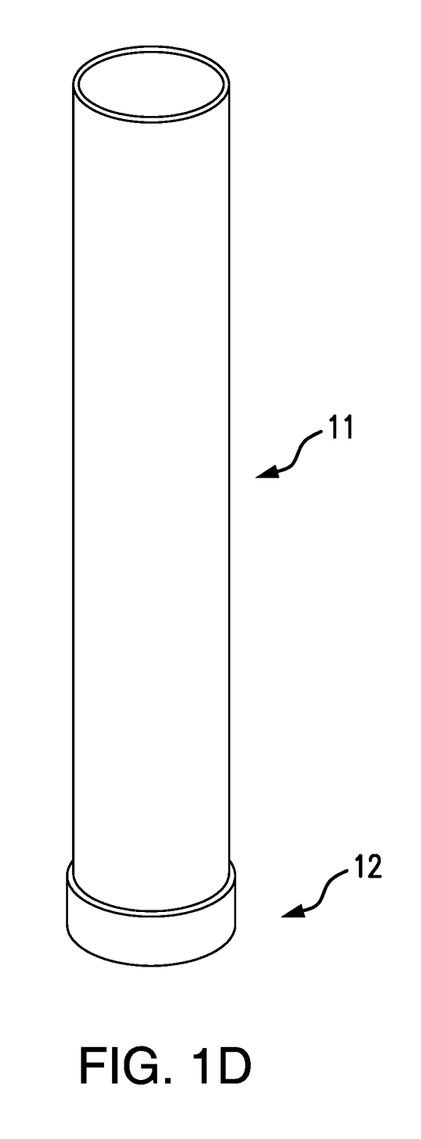
FIG. 1D is a perspective view of the tubular product sleeve with an anchor cap on its distal end.
Figure 2:
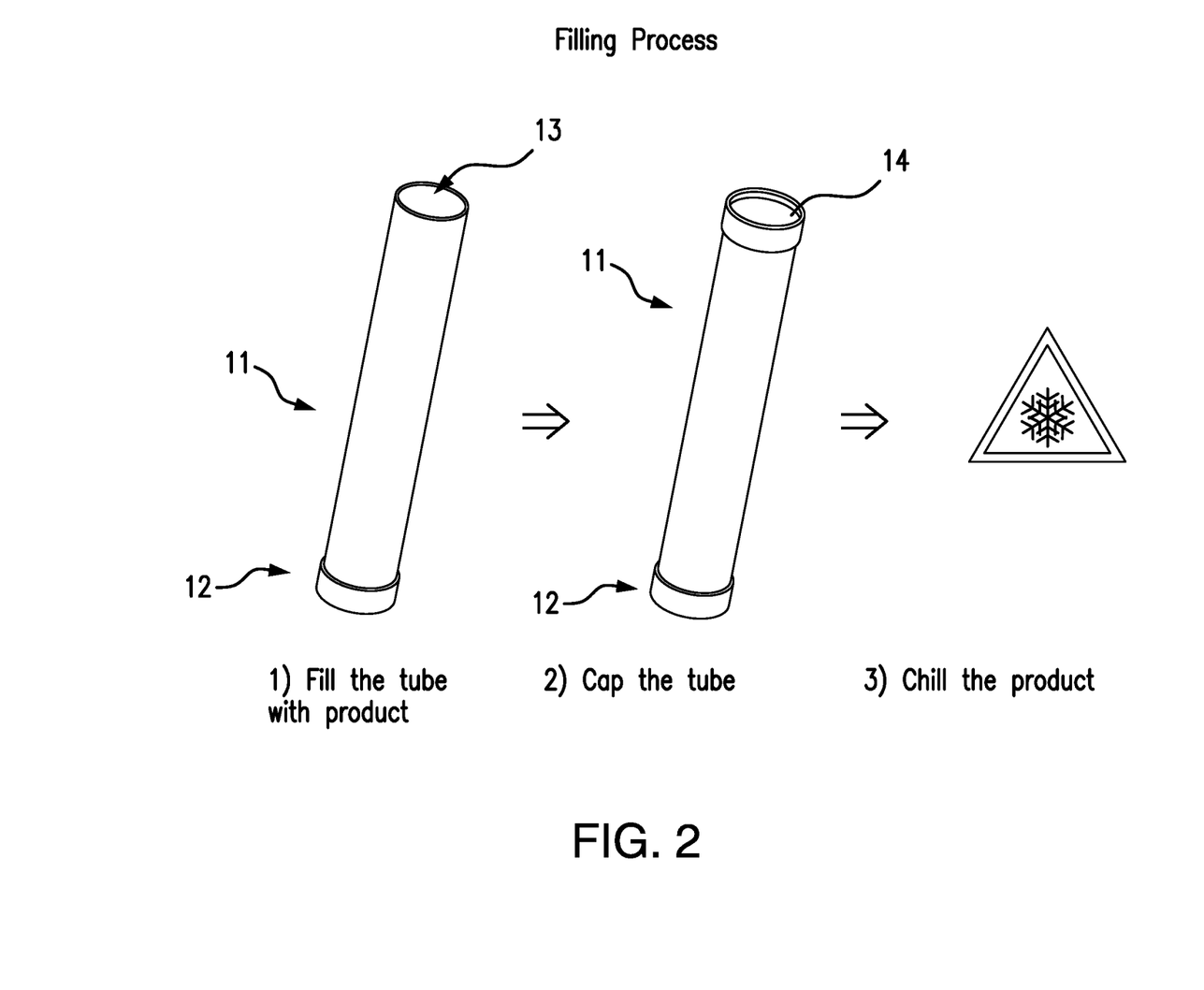
FIG. 2 is a schematic view of the stick product filling process.
Figure 3A:
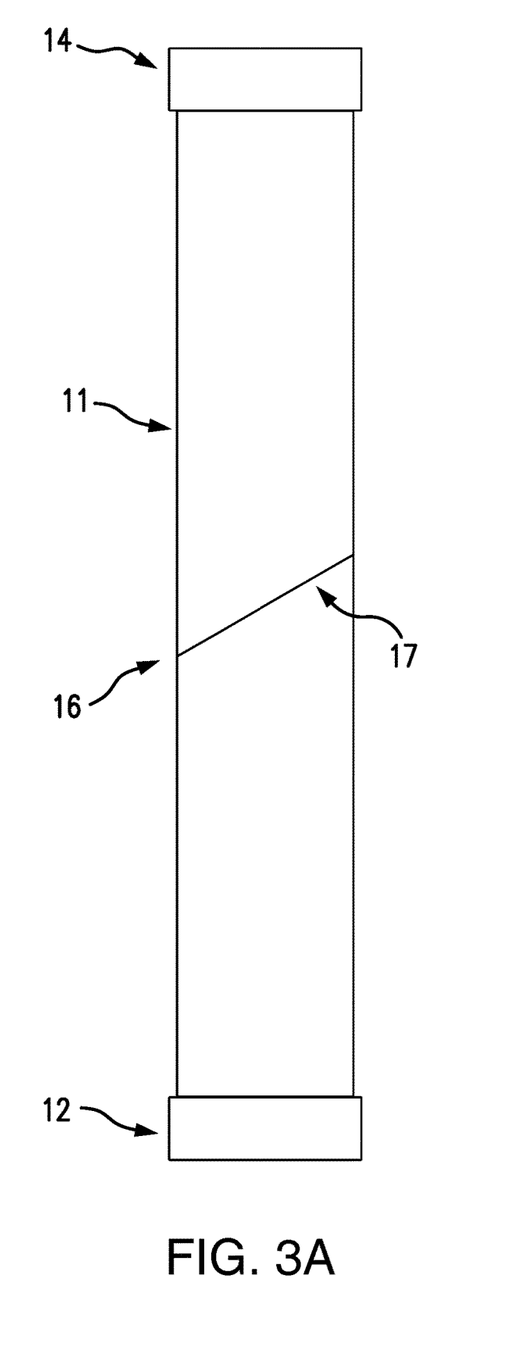
FIG. 3A is a profile view of a filled and capped tubular product sleeve.
Figure 3B:
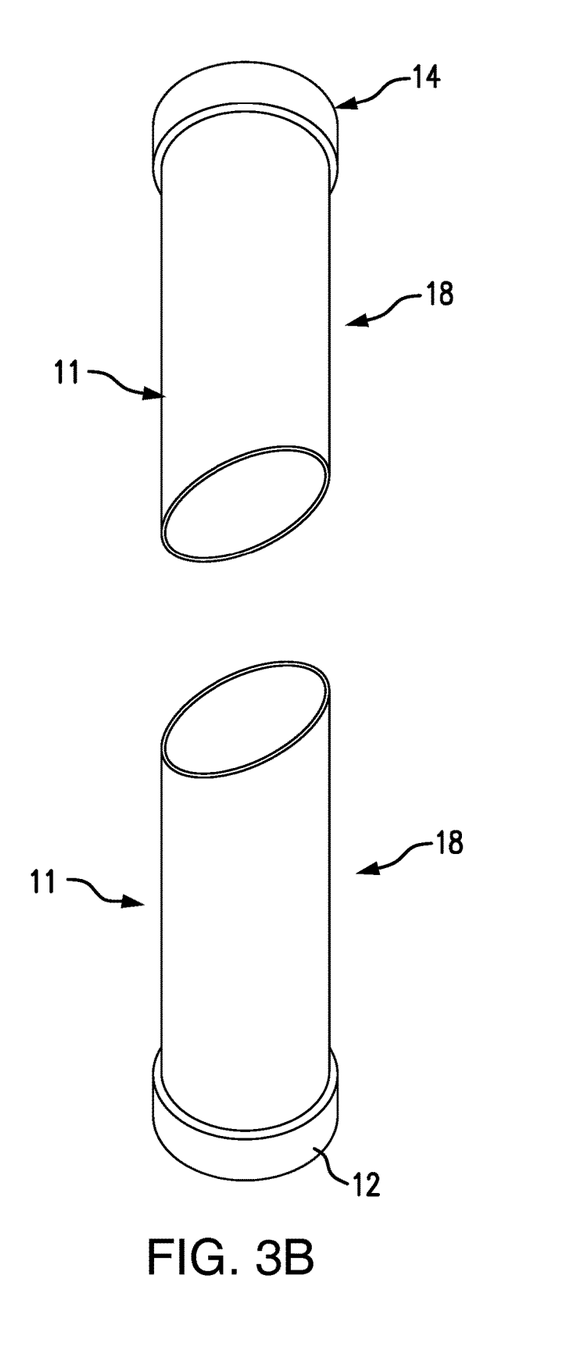
FIG. 3B is a perspective view of the tubular product sleeve angle-cut into two sleeved stick product refills.

As depicted in FIG. 2, the open proximal end of the product sleeve 11 is filled with a melted stick product 13, and the proximal end is capped with a second anchor cap 14. The capped sleeve 11 is then chilled to solidify the stick product within the sleeve 11. The sleeve 11 is next cut at an intermediate point 16, as depicted in FIGS. 3A and 3B. In this embodiment, the stick product is a lipstick so the cut is angular 17. In the case of a deodorant, it would be a square cut. The cut produces two sleeved stick product refills 18.

Figure 4A:
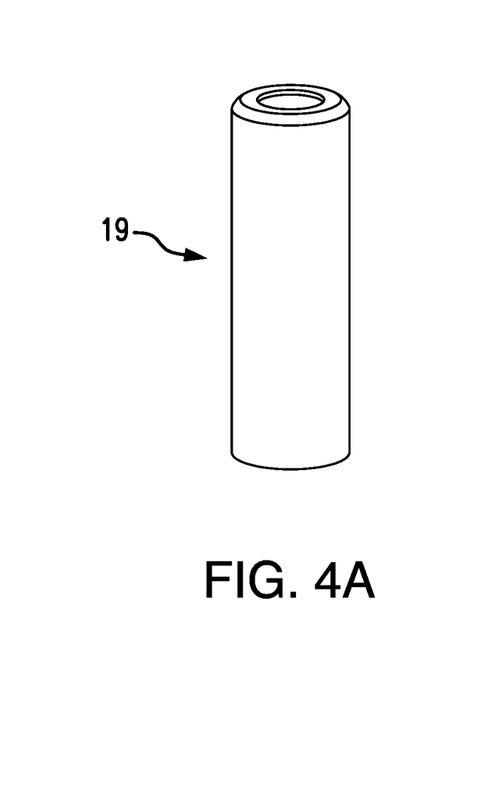
FIG. 4A-4C are perspective views of a protective cover for shipping the stick product refill.
Figure 4B:
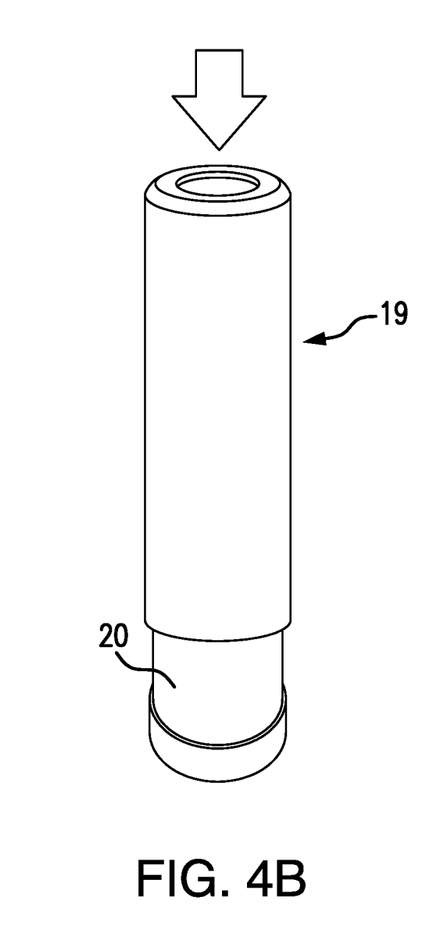
Figure 4C:
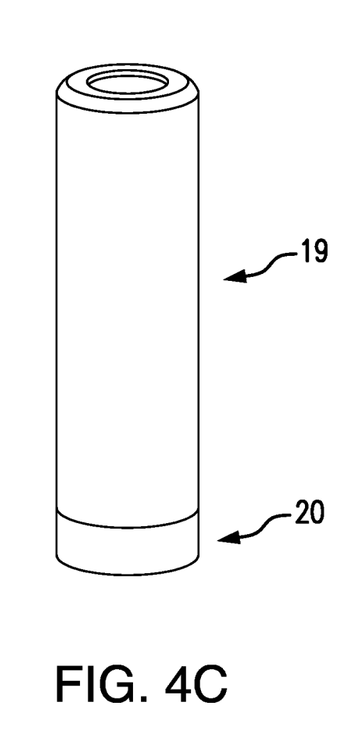
Figure 5:
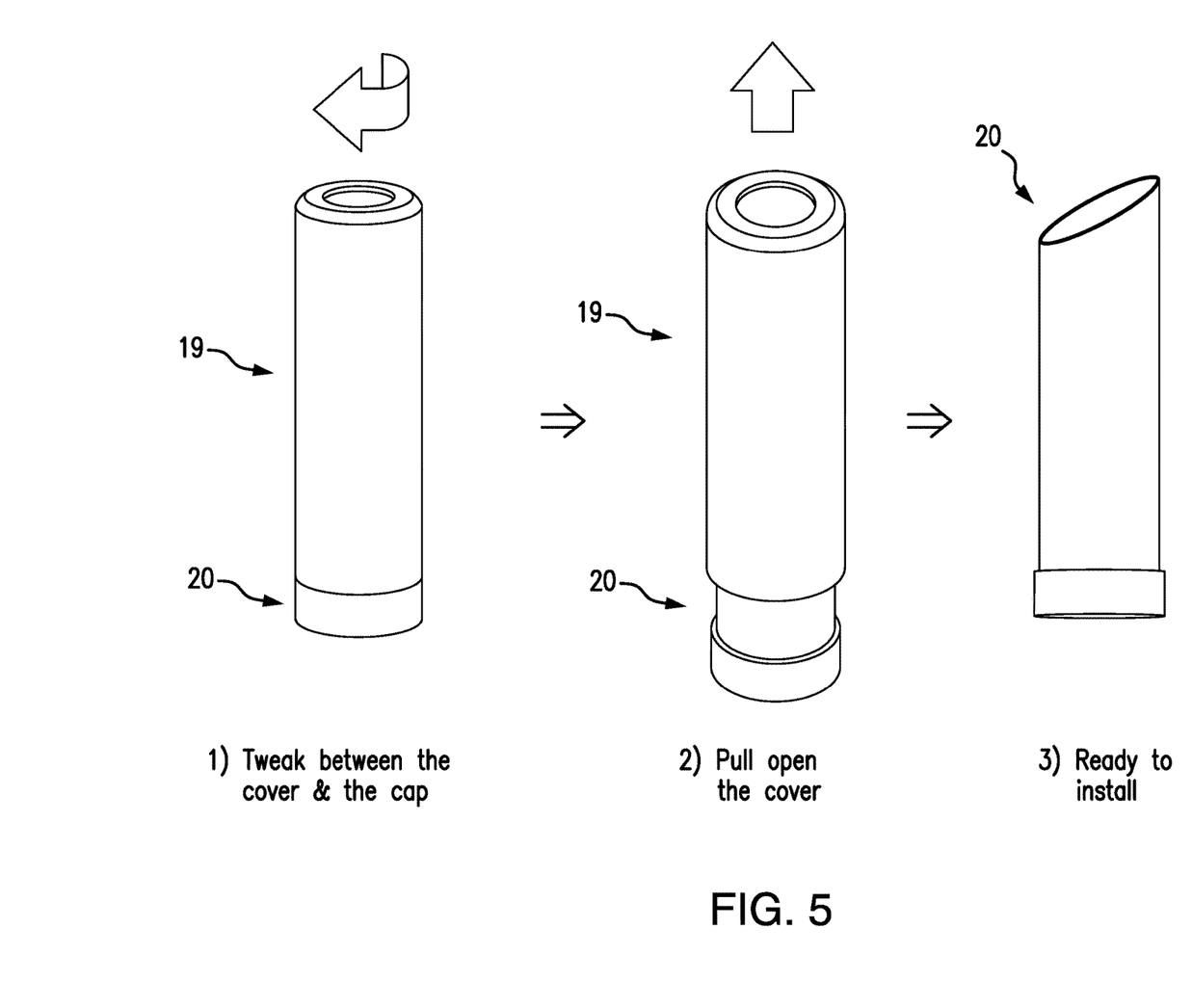
FIG. 5 is a schematic view of the covered stick product refill being prepared for installation.
Figure 6:
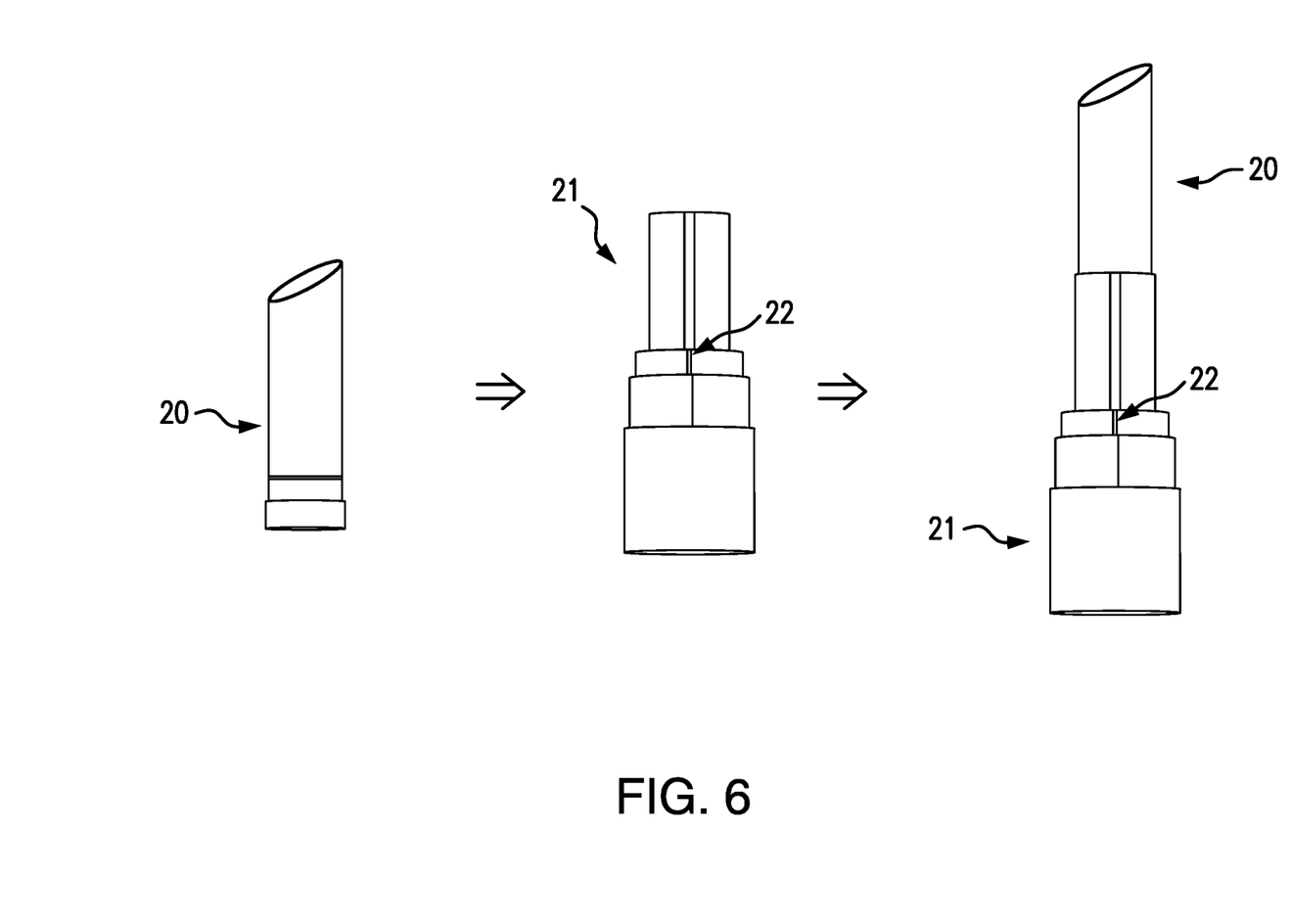
FIG. 6 is a schematic view of the installation of the stick product refill in a dispenser.

Each of the stick product refills 20 is protected with a cover 19, which is glued to the underlying product sleeve 11 in preparation for shipping, as shown in FIGS. 4A-4C. Upon reaching the consumer, the protective cover 19 with the underlying product sleeve 11 is removed, and the stick product refill 20 is ready to be installed in the dispenser 21, as depicted in FIG. 5. As shown in FIG. 6, the stick receptacle 22 of the dispenser 21 is advanced upward, and the stick product refill 20 is inserted therein. FIG. 7 depicts the exemplary propel-repel mechanism 23 having a magnetic attachment means 24 on the receptacle 22 which mates with the ferromagnetic surface on the anchor cap 12 of the stick product refill 20.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. A system for refilling a dispenser having a propel-repel mechanism for longitudinally advancing and retracting within the dispenser a stick receptacle which retains a stick product, the system comprising:
 a stick product refill which replaces a used stick product in the stick receptacle without replacing the propel-repel mechanism of the dispenser, wherein the stick product refill is dimensionally configured to be insertable into an open end of the dispenser and to be seated in or on the stick receptacle, and wherein the stick product refill has a proximal stick end and a distal stick end, and wherein the distal stick end is encased in one of two anchor caps, consisting of a first anchor cap and a second anchor cap, which anchor cap is secured to the stick receptacle by a receptacle attachment means, and wherein the stick product refill, once secured to the stick receptacle, is longitudinally advanceable and retractable within the dispenser by the propel-repel mechanism, such that the proximal stick end protrudes from the open end of the dispenser when in use, and such that the proximal stick end is withdrawn within the dispenser when not in use.

2. The system according to claim 1, wherein the stick product refill is formed by a process comprising the following steps:
 (a) providing a tubular product sleeve, wherein the tubular product sleeve has a sleeve interior dimensionally conforming to the stick product refill, but having a greater length than the stick product refill, and wherein the tubular product sleeve has two sleeve ends, consisting of a proximal sleeve end and a distal sleeve end, and wherein the tubular sleeve has a sleeve intermediate point located between the proximal sleeve end and the distal sleeve end;
 (b) providing the two anchor caps for the two sleeve ends;
 (c) attaching the first anchor cap to the distal sleeve end;
 (d) melting the stick product to produce a melted stick product;
 (e) filling the tubular product sleeve with the melted stick product through the proximal sleeve end;
 (f) attaching the second anchor cap to the proximal sleeve end;
 (g) chilling the tubular product sleeve so as to solidify the melted stick product to produce the stick product within the tubular product sleeve;
 (h) cutting the tubular product sleeve at the sleeve intermediate point to product two sleeved stick product refills; and
 (i) removing the tubular product sleeve from each of the two sleeved stick product refills to produce two of the stick product refills.

3. The system according to claim 2, wherein the stick product refill replaces the used stick product by a process comprising the following steps:
 (a) using the propel-repel mechanism of the dispenser to advance the stick receptacle toward the open end of the dispenser;
 (b) removing the used stick product from the stick receptacle; and
 (c) inserting the distal stick end of the stick product refill into the open end of the dispenser so that the distal stick end engages the stick receptacle and the receptacle attachment means secures the distal stick end to the stick receptacle and so that the propel-repel mechanism can longitudinally advance and retract the stick product refill within the dispenser.

4. The system according to claim 1, wherein the receptacle attachment means comprises a magnet or an adhesive or a conjugate attachment mechanism or a combination thereof, and wherein the receptacle attachment means is located on the anchor caps or on the stick receptacle, or on both.

5. The system according to claim 2, wherein the receptacle attachment means comprises a magnet or an adhesive or a conjugate attachment mechanism or a combination thereof, and wherein the receptacle attachment means can be located on the anchor caps or on the stick receptacle, or on both.

6. The system according to claim 3, wherein the receptacle attachment means comprises a magnet or an adhesive or a conjugate attachment mechanism or a combination thereof, and wherein the receptacle attachment means can be located on the anchor caps or on the stick receptacle, or on both.

7. The system according to claim 2, wherein, in step (h), the tubular product sleeve is cut at an acute angle, so that in step (i) each of the stick product refills has a proximal stick end which is either angled or square-cut.

8. The system according to claim 3, wherein the stick product refill has a proximal stick end which is either angled or square-cut.

9. The system according to claim 5, wherein the stick product refill has a proximal stick end which is either angled or square-cut.

10. The system according to claim 6, wherein the stick product refill has a proximal stick end which is either angled or square-cut.

11. The system according to any one of claim 2-3 or 5-10, wherein the tubular product sleeve has an interior coating which prevents the melted stick product from adhering to the tubular product sleeve.

* * * * *